United States Patent
Yu et al.

(10) Patent No.: US 12,113,215 B2
(45) Date of Patent: Oct. 8, 2024

(54) PREPARATION METHOD FOR PRUSSIAN BLUE SODIUM-ION BATTERY POSITIVE ELECTRODE MATERIAL

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yinghao Xie, Guangdong (CN); Aixia Li, Guangdong (CN); Xuemei Zhang, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/555,558

(22) PCT Filed: Jul. 29, 2022

(86) PCT No.: PCT/CN2022/109229
§ 371 (c)(1),
(2) Date: Oct. 16, 2023

(87) PCT Pub. No.: WO2023/071352
PCT Pub. Date: May 4, 2023

(65) Prior Publication Data
US 2024/0088383 A1    Mar. 14, 2024

(30) Foreign Application Priority Data
Oct. 26, 2021    (CN) .......................... 202111246996.0

(51) Int. Cl.
*H01M 4/58*    (2010.01)
*C01C 3/12*    (2006.01)
*H01M 4/02*    (2006.01)

(52) U.S. Cl.
CPC ................. *H01M 4/58* (2013.01); *C01C 3/12* (2013.01); *C01P 2004/03* (2013.01); *C01P 2006/40* (2013.01); *H01M 2004/028* (2013.01)

(58) Field of Classification Search
None
See application file for complete search history.

(56) References Cited

FOREIGN PATENT DOCUMENTS

| CN | 106654263 A | 5/2017 |
|---|---|---|
| CN | 106745068 A | 5/2017 |

(Continued)

OTHER PUBLICATIONS

Chou et al.; CN110235292 translation provided by Google Mar. 18, 2024.*

(Continued)

*Primary Examiner* — Guinever S Gregorio
(74) *Attorney, Agent, or Firm* — Yue (Robert) Xu; Apex Attorneys at Law, LLP

(57) ABSTRACT

Disclosed is a preparation method for a Prussian blue sodium-ion battery positive electrode material, comprising: adding a first nonionic surfactant and an antioxidant into a sodium ferrocyanide solution to obtain a first solution; adding a second nonionic surfactant into a transition metal salt solution to obtain a second solution; in a protective atmosphere, adding the second solution into the first solution for a precipitation reaction; aging after the reaction has (Continued)

finished; collecting a precipitate, washing same, and carrying out vacuum drying on the washed precipitate; then soaking same in an alcohol solution containing sodium alkoxide; and then filtering same and steam drying to obtain a Prussian blue sodium ion battery positive electrode material. The method may relieve vacuum drying pressure and shorten drying time.

9 Claims, 1 Drawing Sheet

(56) References Cited

FOREIGN PATENT DOCUMENTS

| | | |
|---|---|---|
| CN | 110048104 A | 7/2019 |
| CN | 111943228 A | 11/2020 |
| CN | 112429744 A | 3/2021 |
| CN | 112607748 A | 4/2021 |
| CN | 113488646 A | 10/2021 |
| CN | 114212802 A | 3/2022 |
| JP | 2011180469 A | 9/2011 |

OTHER PUBLICATIONS

Chen et al.; CN113488646 translation provided by GooglePatents Mar. 18, 2024.*
Chen et al.; CN112607748; translation provided by GooglePatent Mar. 18, 2024.*
International Search Report for PCT/CN2022/109229 mailed Oct. 27, 2022, ISA/CN.

* cited by examiner

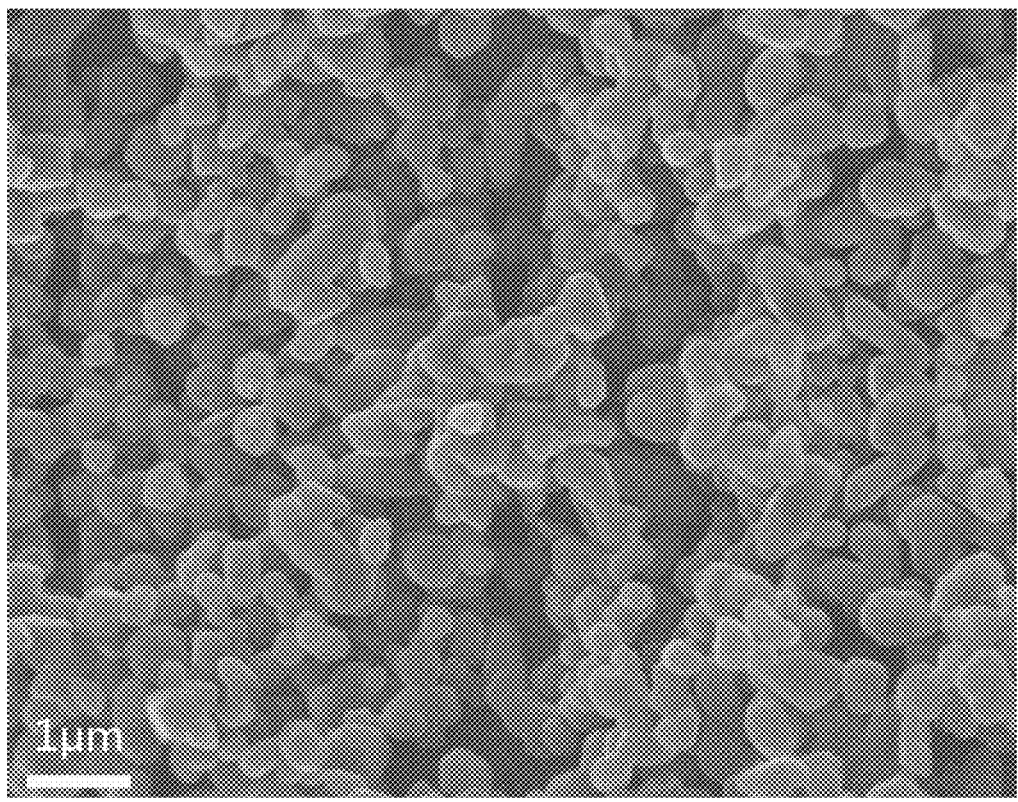

PREPARATION METHOD FOR PRUSSIAN BLUE SODIUM-ION BATTERY POSITIVE ELECTRODE MATERIAL

This application is the national phase of International Application No. PCT/CN2022/109229, titled "PREPARATION METHOD FOR PRUSSIAN BLUE SODIUM-ION BATTERY POSITIVE ELECTRODE MATERIAL", filed on Jul. 29, 2022, which claims the priority to Chinese Patent Application No. 202111246996.0, titled "PREPARATION METHOD FOR PRUSSIAN BLUE SODIUM-ION BATTERY POSITIVE ELECTRODE MATERIAL", filed on Oct. 26, 2021 with the China National Intellectual Property Administration, which are incorporated herein by reference in entirety.

FIELD

The present disclosure relates to the technical field of sodium ion batteries, and specifically relates to a preparation method of a positive electrode material for Prussian blue analogue sodium ion battery.

BACKGROUND

Sodium ion batteries have the same principle and structure as lithium ion batteries, both composed of positive electrode material, negative electrode material, electrolyte and separator. During charging and discharging of the battery, $Na^+$ is intercalated and deintercalated back and forth between the two electrodes: when the battery is charged, $Na^+$ is deintercalated from the positive electrode and intercalated via the electrolyte into the negative electrode, which is in a sodium-rich state.

Sodium ion batteries have the characteristics of low raw material cost, abundant resources, and great electrochemical performance potential. Therefore, they are expected to be applied in the field of large-scale energy storage and are one of the important research directions of next-generation battery technology. At present, positive electrode materials for sodium ion batteries mainly include transition metal oxides, phosphates, and Prussian blue analogue materials. Among them, Prussian blue analogue materials have the advantages of high voltage platform (>3V), large ion channels, large specific capacity, cheap, non-toxic and easy to prepare, and have become a research hotspot of positive electrode materials for sodium ion batteries.

However, currently Prussian blue analogue materials have the following two challenges:

On the one hand, they have poor consistency between particles, and there is currently no relevant literature reported on this issue; on the other hand, they are confronted by problem of water content in the material because the synthesis of Prussian blue analogue materials usually adopts the aqueous phase co-precipitation method and the hydrothermal method. In an aqueous solution, the soluble metal salt reacts rapidly with $Na_4Fe(CN)_6$ to nucleate and grow up. In this process, on the one hand, water molecules can enter the gap position of A site to form interstitial water; on the other hand, $M(CN)_6$ vacancies are prone to exist in the structure (M is Fe, Co, Mn, etc.), and the unsaturated metal atom in the vacancies bonds with the oxygen atom in the water molecules, further introducing new coordinated water molecules, which results in the actual crystal water (including coordination water and interstitial water) content being often greater than 15 wt %.

From the existing research results, the crystal water in the material has a great influence on the electrochemical performance, and its negative effects can be summarized as follows: 1) crystal water occupies the sodium storage site, thus reducing the sodium storage capacity of the material; 2) crystal water can hinder the migration of $Na^+$, leading to the deterioration of the electrode dynamics performance; 3) the coordination water in the vacancy gap suppresses the electrochemical activity of the low-spin Fe attached to C, resulting in the failure of the high-potential platform capacity; 4) in the electrochemical reaction, crystal water and the electrolyte are prone to an irreversible reaction at high potentials, resulting in a decrease in coulombic efficiency. Therefore, reducing the content of crystal water in the material is the key to improving electrochemical performance.

SUMMARY

The present disclosure aims to solve at least one of the technical problems existing in the above-mentioned prior art. For this reason, the present disclosure proposes a preparation method of a positive electrode material for Prussian blue analogue sodium ion battery, which can reduce the water content of the material and improve the consistency.

According to one aspect of the present disclosure, a preparation method of a positive electrode material for Prussian blue analogue sodium ion battery is proposed, which comprises steps of:

adding a first nonionic surfactant and an antioxidant to a sodium ferrocyanide solution to obtain a first solution;

adding a second nonionic surfactant to a transition metal salt solution to obtain a second solution;

under a protective gas atmosphere, adding the second solution to the first solution for precipitation reaction, aging after the reaction is finished, collecting a precipitate, and washing; and vacuum drying the washed precipitate, then soaking in an alcohol solution containing sodium alkoxide, filtering, and evaporating to dryness to obtain a positive electrode material for Prussian blue analogue sodium ion battery. The positive electrode material for Prussian blue analogue sodium ion battery is $Na_xM[Fe(CN)_6]$, wherein $1 \leq x \leq 2$, and M is one or more of Mn, Ni, Fe, V, Cr, Co, Cu and Zn.

In some embodiments of the present disclosure, the first nonionic surfactant and the second nonionic surfactant are independently one or both of polyethylene glycol and polyoxyethylene alkyl amide alcohol; preferably, the first nonionic surfactant is the same as the second nonionic surfactant; preferably, molecular weights of the first nonionic surfactant and the second nonionic surfactant are both ≥1500 g/mol; preferably, a concentration of the first nonionic surfactant in the first solution and a concentration of the second nonionic surfactant in the second solution are both 0.001-0.1 mol/L.

In some embodiments of the present disclosure, a concentration of the sodium ferrocyanide solution is 0.01-1 mol/L.

In some embodiments of the present disclosure, the antioxidant is one or more of butyl hydroxyanisole, dibutyl hydroxytoluene, propyl gallate, tert-butyl hydroquinone and ascorbic acid; preferably, a concentration of the antioxidant in the first solution is 0.001-0.25 mol/L.

In some embodiments of the present disclosure, a concentration of the transition metal salt solution is 0.01-1 mol/L; preferably, an addition flow rate of the second solution is 25-50 mL/h.

In some embodiments of the present disclosure, the protective gas is one or both of nitrogen or argon.

In some embodiments of the present disclosure, a duration of the aging is 2-48 hours.

In some embodiments of the present disclosure, a temperature of the vacuum drying is 100-120° C.; preferably, a duration of the vacuum drying is 12-24 h.

In some embodiments of the present disclosure, the sodium alkoxide is one or both of sodium methoxide and sodium ethoxide.

In some embodiments of the present disclosure, the alcohol solution is one or both of anhydrous methanol and anhydrous ethanol.

In some embodiments of the present disclosure, when soaking, a solid-to-liquid ratio of the precipitate to the alcohol solution is 1 g:(5-100) mL; preferably, a duration of the soaking is 0.5-2 h.

In some preferred embodiments of the present disclosure, the sodium alkoxide is sodium ethoxide, and the alcohol solution is anhydrous ethanol. Since sodium methoxide is flammable, explosive and difficult to control, the alcohol solution of sodium alkoxide is preferably anhydrous ethanol of sodium ethoxide. Sodium ethoxide can react with the water in the crystal lattice to produce ethanol and sodium hydroxide. Sodium hydroxide is soluble in ethanol and removed by filtration. Before the evaporation to dryness, it further comprises washing the precipitate obtained by the filtration with anhydrous methanol. The solubility of sodium hydroxide in methanol is higher than that of ethanol, and therefore, the purity of the product can be further improved. In addition, methanol is a small molecule compound that can enter the crystal lattice of $Na_xM[Fe(CN)_6]$ to replace the position of water to avoid secondary water absorption.

In some embodiments of the present disclosure, a concentration of the sodium alkoxide in the alcohol solution is 0.05-0.5 mol/L.

According to a preferred embodiment of the present disclosure, the present disclosure has at least the following beneficial effects:

1. Ferrocyanide ions are easily converted into ferricyanide ions or dissociated into iron ions and cyanide ions under light. An antioxidants is added to alleviate the occurrence of this reaction and further improve the purity of the target product;
2. The same nonionic surfactant is added to the sodium ferrocyanide solution and the transition metal salt solution. After the nonionic surfactant is dissolved in water, the oxygen atom on the ether bond forms a weak hydrogen bond with the hydrogen atom in the solution. The molecular chain is tortuous. The hydrophilic oxygen atom is located on the outside of the chain, and the hydrophobic segment (for example, ethylidene, $-CH_2CH_2-$) is located on the inside of the chain, so the surrounding of the chain looks like a hydrophilic whole. This hydrophilic whole is combined with $Na_xM[Fe(CN)_6] \cdot nH_2O$ crystals through hydrogen bonds, and is adsorbed on the crystal surface to form steric hindrance, inhibiting the advantage of C-axis growth, and ultimately ensuring the uniformity of the crystals, which makes the product particles have high consistency, and improves the safety, cycling and specific capacity when used as a positive electrode material;
3. Two-stage water removal technique includes first performing vacuum drying to remove most of the crystal water, and then using an alcohol solution containing sodium alkoxide to soak to further remove the water in the crystal lattice, so that the water content of the material is <0.1 wt %, so as to solve a series of serious problems caused by high water content in the material. Sodium alkoxide can react with the moisture in the crystal lattice to produce sodium hydroxide, which can be dissolved in alcohol solution and removed by filtration. The method can reduce the pressure of vacuum drying and shorten the duration of the drying.

BRIEF DESCRIPTION OF DRAWINGS

The present disclosure is further described below in conjunction with the drawings and embodiments, in which:

FIG. 1 is an SEM image of the positive electrode material for Prussian blue analogue sodium ion battery prepared in Example 1 of the present disclosure.

DETAILED DESCRIPTION

Hereinafter, the concept of the present disclosure and the technical effects produced by the present disclosure will be described clearly and completely in conjunction with the embodiments, so as to fully understand the purpose, features and effects of the present disclosure. It is apparent that the described embodiments are only a part of the embodiments of the present disclosure, rather than all of them. All the other embodiments obtained by those skilled in the art based on the embodiments of the present disclosure without any creative work fall into the scope of the present disclosure.

Example 1

In this example, a positive electrode material for Prussian blue analogue sodium ion battery is prepared, and the specific process is as follows:

(1) A sodium ferrocyanide solution with a concentration of 0.01 mol/L was prepared, and polyethylene glycol with a concentration of 0.001 mol/L and ascorbic acid with a concentration of 0.001 mol/L were added;

(2) A manganese sulfate solution with a metal ion concentration of 0.01 mol/L was prepared, and the same polyethylene glycol as in step (1) with a concentration of 0.001 mol/L was added;

(3) In a nitrogen atmosphere, the manganese sulfate solution was added to the sodium ferrocyanide solution through a peristaltic pump at a fixed flow rate of 50 mL/h for the precipitation reaction. After the reaction was finished, aging was carried out for 2-4 hours;

(4) A precipitate was collected by centrifugation and washed with deionized water and anhydrous ethanol;

(5) The precipitate was subjected to vacuum drying at 100° C. for 24 h;

(6) According to the solid-liquid ratio of 1 g:5 mL, the precipitate was soaked in anhydrous ethanol containing 0.1 mol/L sodium ethoxide for 2 h, filtered, washed with anhydrous methanol, and evaporated to dryness to obtain the positive electrode material for Prussian blue analogue sodium ion battery $Na_2Mn[Fe(CN)_6]$, with a water content of the material being 0.081 wt %.

The positive electrode material for Prussian blue analogue sodium ion battery prepared in this example was assembled into a sodium ion half-cell with organic electrolyte system, which was tested for electrochemical performance. The initial specific discharge capacity at 0.1C was 143.1 mAh/g, and the specific discharge capacity after 200 cycles was still 136.2 mAh/g, indicating that it had good rate capability and cycle performance.

FIG. 1 is an SEM image of the positive electrode material for Prussian blue analogue sodium ion battery prepared in this example. From the FIGURE, it can be seen that the crystal particles were consistent and uniform, indicating that the product particles had high consistency.

Example 2

In this example, a positive electrode material for Prussian blue analogue sodium ion battery is prepared, and the specific process is as follows:
(1) A sodium ferrocyanide solution with a concentration of 0.05 mol/L was prepared, and polyoxyethylene alkyl amide alcohol with a concentration of 0.01 mol/L and butyl hydroxyanisole with a concentration of 0.01 mol/L were added;
(2) A nickel sulfate solution with a metal ion concentration of 0.05 mol/L was prepared, and the same polyoxyethylene alkyl amide alcohol as in step (1) with a concentration of 0.01 mol/L was added;
(3) In an argon atmosphere, the nickel sulfate solution was added to the sodium ferrocyanide solution through a peristaltic pump at a flow rate of 40 mL/h for the precipitation reaction. After the reaction was finished, aging was carried out for 10-12 hours;
(4) A precipitate was collected by centrifugation and washed with deionized water and anhydrous ethanol;
(5) The precipitate was subjected to vacuum drying at 110° C. for 18 h;
(6) According to the solid-liquid ratio of 1 g:50 mL, the precipitate was soaked in anhydrous ethanol containing 0.1 mol/L sodium ethoxide for 2 h, filtered, washed with anhydrous methanol, and evaporated to dryness to obtain the positive electrode material for Prussian blue analogue sodium ion battery $Na_2Ni[Fe(CN)_6]$, with a water content of the material being 0.076 wt %.

The positive electrode material for Prussian blue analogue sodium ion battery prepared in this example was assembled into a sodium ion half-cell with organic electrolyte system, which was tested for electrochemical performance. The initial specific discharge capacity at 0.1C was 82.3 mAh/g, and the specific discharge capacity after 200 cycles was still 76.7 mAh/g, indicating that it had good rate capability and cycle performance.

Example 3

In this example, a positive electrode material for Prussian blue analogue sodium ion battery is prepared, and the specific process is as follows:
(1) A sodium ferrocyanide solution with a concentration of 1 mol/L was prepared, and polyethylene glycol with a concentration of 0.1 mol/L and tert-butyl hydroquinone with a concentration of 0.25 mol/L were added;
(2) A cobalt sulfate solution with a metal ion concentration of 1 mol/L was prepared, and the same polyethylene glycol as in step (1) with a concentration of 0.1 mol/L was added;
(3) In a nitrogen atmosphere, the cobalt sulfate solution was added to the sodium ferrocyanide solution through a peristaltic pump at a fixed flow rate of 25 mL/h for the precipitation reaction. After the reaction was finished, aging was carried out for 24-48 hours;
(4) A precipitate was collected by centrifugation and washed with deionized water and anhydrous ethanol;
(5) The precipitate was subjected to vacuum drying at 120° C. for 12 h;
(6) According to the solid-liquid ratio of 1 g:100 mL, the precipitate was soaked in anhydrous ethanol containing 0.05 mol/L sodium ethoxide for 2 h, filtered, washed with anhydrous methanol, and evaporated to dryness to obtain the positive electrode material for Prussian blue analogue sodium ion battery $Na_2Co[Fe(CN)_6]$, with a water content of the material being 0.059 wt %.

The positive electrode material for Prussian blue analogue sodium ion battery prepared in this example was assembled into a sodium ion half-cell with organic electrolyte system, which was tested for electrochemical performance. The initial specific discharge capacity at 0.1C was 138.7 mAh/g, and the specific discharge capacity after 200 cycles was still 134.6 mAh/g, indicating that it had good rate capability and cycle performance.

Comparative Example 1

In this comparative example, a positive electrode material for Prussian blue analogue sodium ion battery is prepared. The difference from Example 1 is that step (6) was not performed, and the product was directly obtained after the vacuum drying in step (5). The water content of the resulting material was 2.88 wt %.

The positive electrode material for Prussian blue analogue sodium ion battery prepared in this comparative example was assembled into a sodium ion half-cell with organic electrolyte system, which was tested for electrochemical performance. The initial specific discharge capacity at 0.1C was 132.5 mAh/g, and the specific discharge capacity after 200 cycles was still 121.9 mAh/g. The performance of the material without water removal treatment in step (6) was reduced. This is because even after 24 h of vacuum drying, the water removal was not complete enough, and the material still contained a part of crystal water, which affected the material performance.

The embodiments of the present disclosure have been described in detail above in conjunction with the drawings. However, the present disclosure is not limited to the above-mentioned embodiments, and various modifications can be made without departing from the purpose of the present disclosure within the scope of knowledge possessed by those of ordinary skill in the art. In addition, in the case of no conflict, the embodiments of the present disclosure and the features in the embodiments may be combined with each other.

The invention claimed is:

1. A preparation method of a positive electrode material for Prussian blue analogue sodium ion battery, comprising steps of:
   adding a first nonionic surfactant and an antioxidant to a sodium ferrocyanide solution to obtain a first solution;
   adding a second nonionic surfactant to a transition metal salt solution to obtain a second solution;
   under a protective gas atmosphere, adding the second solution to the first solution for precipitation reaction, aging after the reaction is finished, collecting a precipitate, and washing; and
   vacuum drying the washed precipitate, then soaking in an alcohol solution containing sodium alkoxide, filtering, and evaporating to dryness to obtain a positive electrode material for Prussian blue analogue sodium ion battery;

wherein the first nonionic surfactant and the second nonionic surfactant are independently one or both of polyethylene glycol and polyoxyethylene alkyl amide alcohol; the first nonionic surfactant is the same as the second nonionic surfactant; molecular weights of the first nonionic surfactant and the second nonionic surfactant are both ≥1500 g/mol; a concentration of the first nonionic surfactant in the first solution and a concentration of the second nonionic surfactant in the second solution are both 0.001-0.1 mol/L.

2. The preparation method according to claim 1, wherein the antioxidant is one or more of butyl hydroxyanisole, dibutyl hydroxytoluene, propyl gallate, tert-butyl hydroquinone and ascorbic acid; a concentration of the antioxidant in the first solution is 0.001-0.25 mol/L.

3. The preparation method according to claim 1, wherein a concentration of the transition metal salt solution is 0.01-1 mol/L; an addition flow rate of the second solution is 25-50 mL/h.

4. The preparation method according to claim 1, wherein a temperature of the vacuum drying is 100-120° C.; a duration of the vacuum drying is 12-24 h.

5. The preparation method according to claim 1, wherein the sodium alkoxide is one or both of sodium methoxide and sodium ethoxide.

6. The preparation method according to claim 1, wherein the alcohol solution is one or both of anhydrous methanol and anhydrous ethanol.

7. The preparation method according to claim 1, wherein when soaking, a solid-to-liquid ratio of the precipitate to the alcohol solution is 1 g:(5-100) mL; a duration of the soaking is 0.5-2 h.

8. The preparation method according to claim 1, wherein a concentration of the sodium alkoxide in the alcohol solution is 0.05-0.5 mol/L.

9. The preparation method according to claim 1, further comprising washing the precipitate obtained by the filtration with anhydrous methanol before the evaporation to dryness.

* * * * *